(12) United States Patent
Sausner

(10) Patent No.: US 6,540,263 B1
(45) Date of Patent: Apr. 1, 2003

(54) RAPID-ACTION COUPLING FOR HOSES OR RIGID LINES IN MOTOR VEHICLES

(75) Inventor: Andreas Sausner, Frankfurt (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/671,494

(22) Filed: Sep. 27, 2000

(30) Foreign Application Priority Data

Sep. 27, 1999 (DE) .......................... 199 46 260

(51) Int. Cl.⁷ ................................ F16L 37/00
(52) U.S. Cl. ........................ 285/305; 285/308
(58) Field of Search ................. 285/305, 308, 285/319

(56) References Cited

U.S. PATENT DOCUMENTS

| | | | | | |
|---|---|---|---|---|---|
| 4,244,608 A | * | 1/1981 | Stuemky | ..................... | 285/305 |
| 4,524,995 A | * | 6/1985 | Bartholomew | .......... | 285/305 X |
| 4,804,213 A | * | 2/1989 | Guest | ......................... | 285/308 |
| 5,374,088 A | * | 12/1994 | Moretti et al. | .............. | 285/305 |
| 5,423,577 A | | 6/1995 | Ketcham | | |
| 5,452,924 A | * | 9/1995 | Kujawski | ..................... | 285/305 |
| 5,683,117 A | * | 11/1997 | Corbett et al. | .......... | 285/305 X |
| 5,730,481 A | * | 3/1998 | Szabo et al. | ................ | 385/305 |
| 5,782,502 A | | 7/1998 | Lewis | | |
| 5,951,063 A | | 9/1999 | Szabo | | |
| 6,155,612 A | | 12/2000 | Szabo | | |
| 6,293,596 B1 | * | 9/2001 | Kinder | ....................... | 285/305 |

* cited by examiner

*Primary Examiner*—Lynne H. Browne
*Assistant Examiner*—David E. Bochna
(74) *Attorney, Agent, or Firm*—Young & Basile, P.C.

(57) ABSTRACT

A rapid-action coupling for hoses or rigid lines with a coupling box, a plug-in nipple and a locking element. The coupling housing has a recess and an opening that extends essentially vertically with respect to the longitudinal axis of the recess. The plug-in nipple and the coupling housing are connected by introducing the nipple into the recess. The nipple is locked by introducing a locking element into a first end of an opening into engagement with the housing. The locking element includes an arm for releasing the engagement.

10 Claims, 5 Drawing Sheets

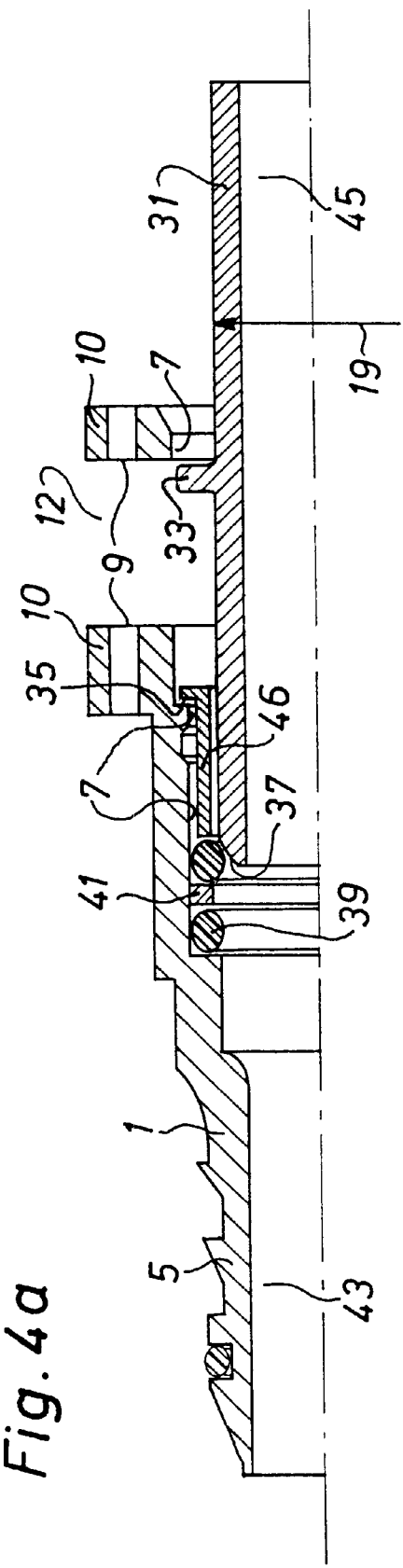
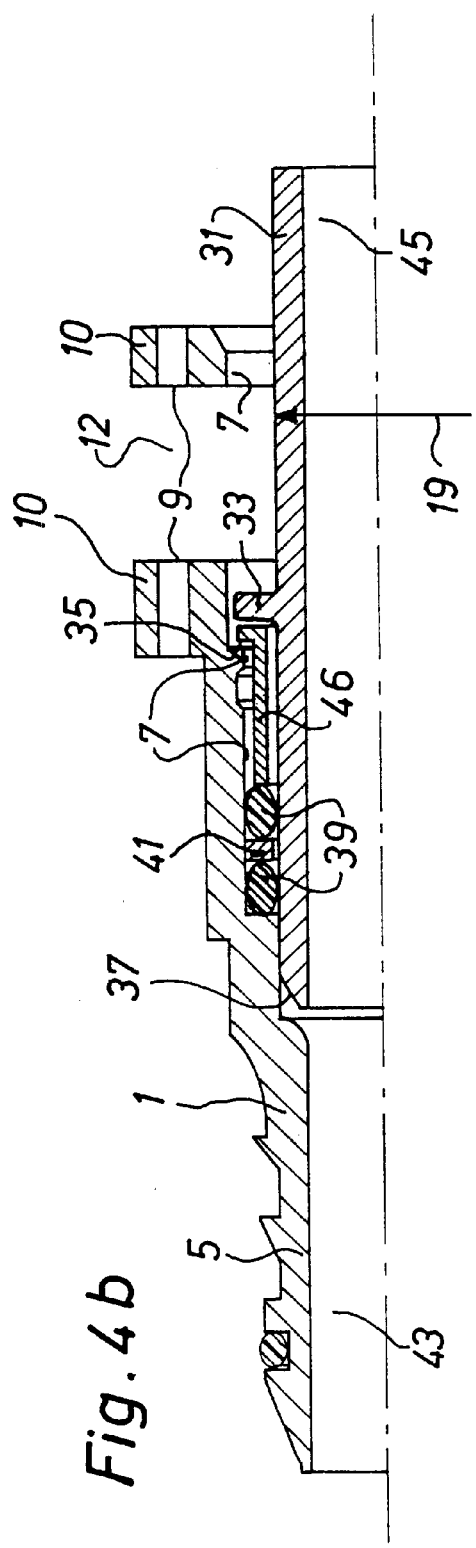
Fig. 4a
Fig. 4b

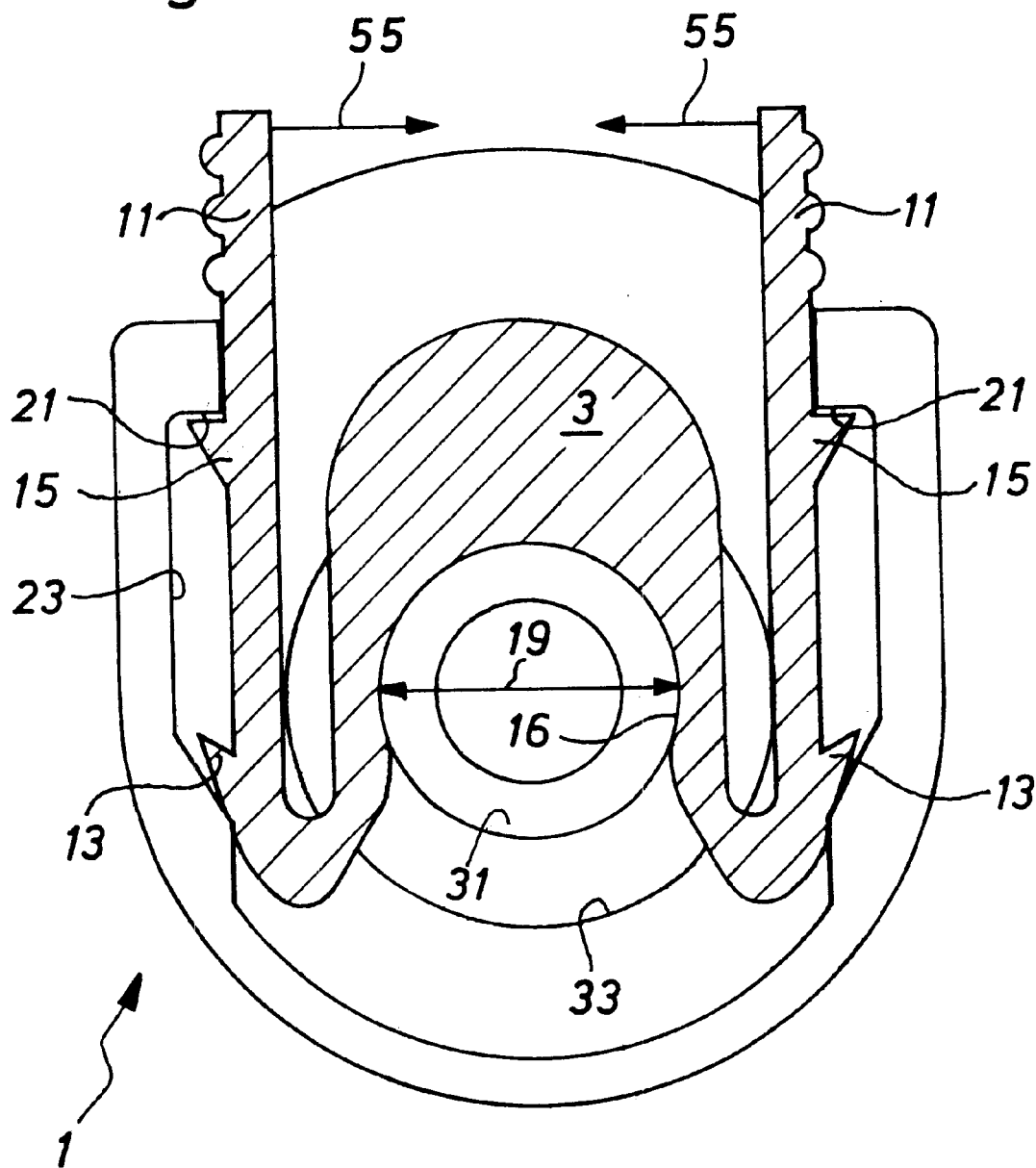

RAPID-ACTION COUPLING FOR HOSES OR RIGID LINES IN MOTOR VEHICLES

BACKGROUND

The invention is based on a rapid-action coupling for hoses or rigid lines with a coupling box, a plug-in nipple and a locking element, where the coupling box has a recess and an opening that extends essentially vertically with respect to the longitudinal axis of the recess with a first end and a second end, where the plug-in nipple and the coupling box can be connected by -introducing the plug-in nipple into the recess of the coupling box and this connection can be locked by introducing the locking element into the first end of the opening and by engaging it in the axial direction and where the locking element has a means for releasing the engagement.

According to the state of the art, it is disadvantageous in the case of rapid-action couplings that in order to lock the rapid-action coupling and to release it, access to the rapid-action coupling from both sides of the opening must be ensured. This is due to the fact that the locking element is introduced into the opening from a first end of the opening up to the point where the locking element engages with the coupling box and the locking element is released from the second end of the opening.

Thus, it is the task of the invention to provide a rapid-action coupling for hoses or rigid lines where the demand for accessibility during the locking of the rapid-action coupling and during the separation of the rapid-action coupling is minimal and, furthermore, the danger of an unintended release of the rapid-action coupling is reduced.

SUMMARY

In accordance with the invention, this task is solved by a rapid-action coupling for hoses or rigid lines with a coupling box, a plug-in nipple and a locking element, wherein the coupling housing has a recess and an opening that extends essentially vertically with respect to the longitudinal axis of the recess with a first end and a second end, wherein the plug-in nipple and the coupling housing can be connected by introducing the plug-in nipple into the recess and this connection can be locked by introducing the locking element into the first end of the opening and by engaging it there, where the locking element has a means for releasing the engagement and where the means for releasing the engagement in the engaged state of the locking element are arranged in the area of the first end of the opening.

In accordance with the invention, due to the arrangement of the means for releasing the engagement, accessibility of the rapid-action coupling in the area of the second end of the opening is not necessary. For this reason, the rapid-action coupling of the invention can be installed in spatially restricted areas. Furthermore, it is easier to lock and separate since both processes are carried out from the same side. Finally, an unintended separation of the rapid-action coupling of the invention is, for the most part, impossible since the coupling housing of the rapid-action coupling of the invention affords fewer opportunities for an unintentional external influence on the locking element.

In a variant of the invention, the opening is provided that with at least one recess and the respective recesses can be engaged by a projection of the locking element. As an alternative, the locking element is also provided with at least one recess and the respective recesses that can engage with one projection of the opening. Common to both embodiments is the fact that the engagement by means of a projection and a corresponding recess is extremely reliable and, nevertheless, simple to manufacture.

In one embodiment of the invention, the projections of the locking element are in functional connection with the means for releasing the engagement by means of a one-armed lever and the projections of the locking element are arranged between the fulcrum of the one-armed lever and the means for releasing the engagement.

In another embodiment of the invention, the recesses of the locking element are in functional connection with the means for releasing the engagement by means of a one-armed lever and the recesses of the locking element are arranged between the fulcrum of the one-armed lever and the means for releasing the engagement.

Common to both embodiments is the fact that, due to the use of a one-armed lever, a simple and reliable release of the engagement is possible. Furthermore, this embodiment is particularly advantageous from the point of view of production technology since the required injection-molding die can be in a simple form. As a supplement to the invention, it is provided that the projections of the locking element are in functional connection with the means for releasing the engagement via a two-armed lever and that the fulcrum of the two-armed lever is arranged between the projections of the locking element and the means for releasing the engagement. In another embodiment of the invention, the recesses of the locking element are in functional connection with the means for releasing the engagement via a two-armed lever and the fulcrum of the two-armed lever is arranged between the recesses of the locking element and the means for releasing the engagement. Common to these embodiments is the fact that the selection of the transmission ratios between the movement of the projections or of the recess(es) of the locking element and the movement of the means for releasing the engagement can be made freely with broad parameters and, moreover, the direction of movement is reversed. By reversing the direction of movement, it can be achieved that an external force acting on the means for releasing the engagement cannot release this engagement but further secures it. Thereby, the danger of an unintentional separation of the rapid-action coupling is further reduced.

In a variant of the invention, the lever(s) are spring-loaded so that the locking element automatically engages when it is introduced into the opening and an unintentional release of the engagement is prevented.

As a supplement to the invention, the plug-in nipple has a flange and the locking element has at least one recess, which, in the engaged state of the locking element, partially grips around the plug-in nipple in the area between the flange and the end of the recess that opposite the base of the recess and whose width, at least in part, is smaller than the diameter of the flange, so that the separation of the coupling housing and the plug-in nipple, while the locking element is engaged, is prevented simply and effectively.

In another embodiment of the invention, the second end of the opening is closed so that the coupling housings have an outer contour with a smooth surface and the penetration of dirt into the interior of the coupling housing is reduced.

In another embodiment of the invention, the coupling housings and the plug-in nipple can be connected to each other in a torsion-resistant manner, so that the hoses or rigid lines connected to the rapid-action coupling cannot be turned against each other.

In another supplement to the invention, sealing elements, particularly O-rings, are present in the recess which seal off a through-hole of the coupling housings and a through-hole of the plug-in nipple with respect to the outside, so that the medium conveyed by the connected hoses or the rigid line cannot escape to the outside.

In another embodiment of the invention, the locking element is provided with an end stop that cooperates with the coupling housing, so that the locking element is not introduced too far into the opening.

In one embodiment of the invention, the coupling housings, the plug-in nipple, and/or the locking element are made of a synthetic material, so that good corrosion resistance as well as a sufficient temperature stability are achieved. Tests were conducted with special synthetic materials in which a flame resistance at 600° over 8 min, a possible continuous temperature of 150° and a brief temperature load up to 200° C. by way of exception also 300°C., was exhibited.

BRIEF DESCRIPTION OF THE DRAWING

Additional advantages and advantageous embodiments can be gathered from the attached drawing, the description and the claims.

Embodiment examples of the object of the invention are shown in the drawing and are described in greater detail in the following text, wherein

FIGS. 4a and 4b show, partial cross section views of a rapid-action coupling;

FIG. 7 is a cross-sectional view through another embodiment of a coupling housing with a locking element.

DETAILED DESCRIPTION

Figure 1:
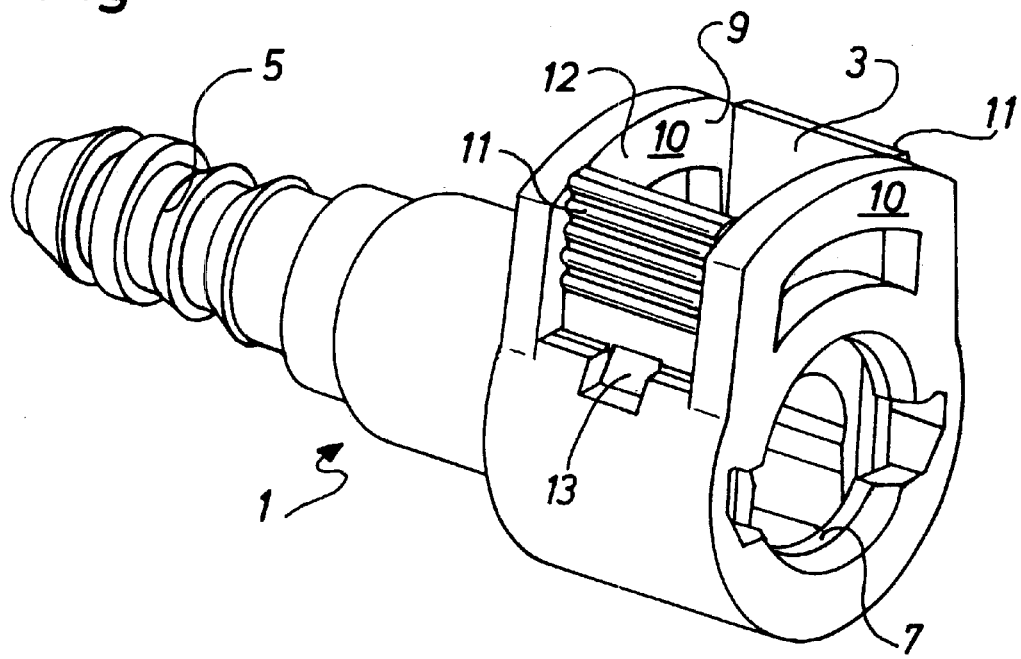
FIG. 1 shows a perspective view of a first example of a coupling housing of the invention with engaged locking element without plug-in nipple.

FIG. 1 shows a coupling box 1 and a locking element 3 in the engaged state. The coupling box 1 has a receptacle 5 at one end for the attachment of a hose, not shown, or a rigid line. A recess 7 is located at the other end of the coupling box 1. The plug-in nipple, not shown, can be introduced into the recess 7, when the locking element is not engaged.

In FIG. 1, the locking element 3 is arranged in an opening 9 and is engaged there. In this representation, the engagement of the locking element 3 is not shown. Crosspieces 10 are located at the two sides of the opening 9 to prevent inadvertent release of the engagement due to the influence of forces on two gripping surfaces 11 arranged at the locking element 3. When the gripping surfaces 11 are moved toward each other, not shown in FIG. 1, the engagement of the locking element 3, is released, and the locking element 3 can be pulled in the upward direction from a first end 12 out of the opening 9. An end stop 13 prevents the locking element from being introduced too far, into the opening 9, in the. direction of a second end opposite the first end 12.

Figure 2:
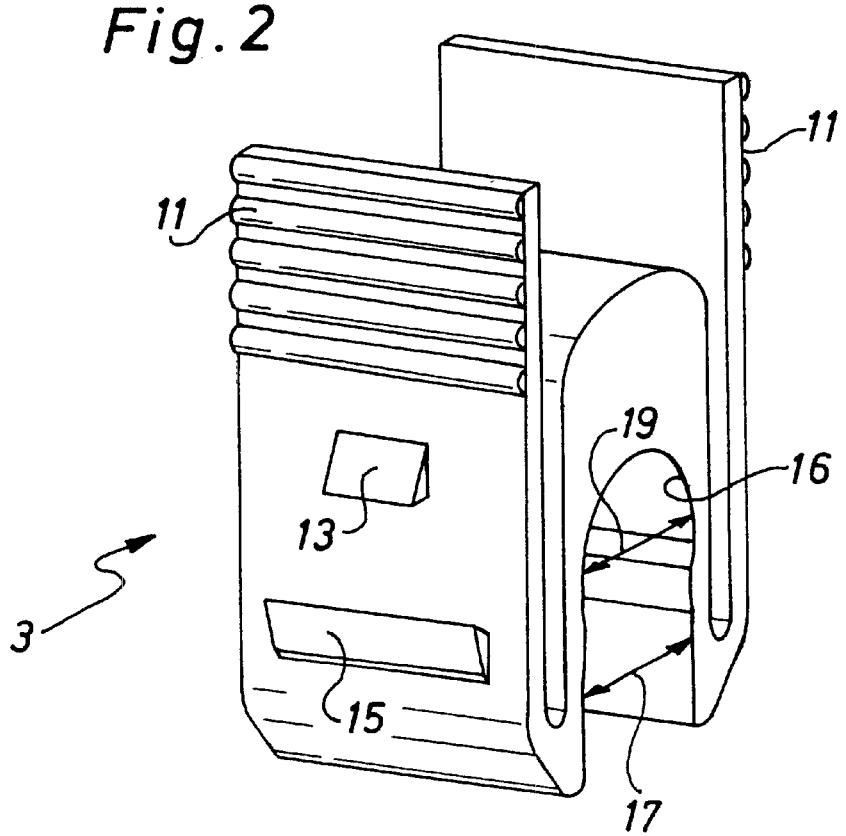
FIG. 2 shows a perspective view of the accompanying locking element.

In FIG. 2, a locking element 3 is shown. The locking element 3 is symmetrically constructed. When the gripping surfaces 11 are moved toward each other, the projections 15 located on both sides of the locking element 3 also move toward each other. The projections 15, of which only the one arranged on the front of the locking element 3 is shown, have the function of latches that interact with a corresponding recess in the coupling housing. By moving the gripping surfaces 11 toward each other, the projections 15 are lifted out of the recesses in the coupling housing 1 interacting with them, so that the locking element 3 can be removed from the opening 9 of the coupling housing 1. A cut-out 16 is present in the center of the locking element 3. The width 17 and the diameter 19 of the arc at the end of the cutout 16 correspond to the outer diameter of a plug-in nipple, not shown. Finally, the end stop 13 can also be seen.

Figure 3:
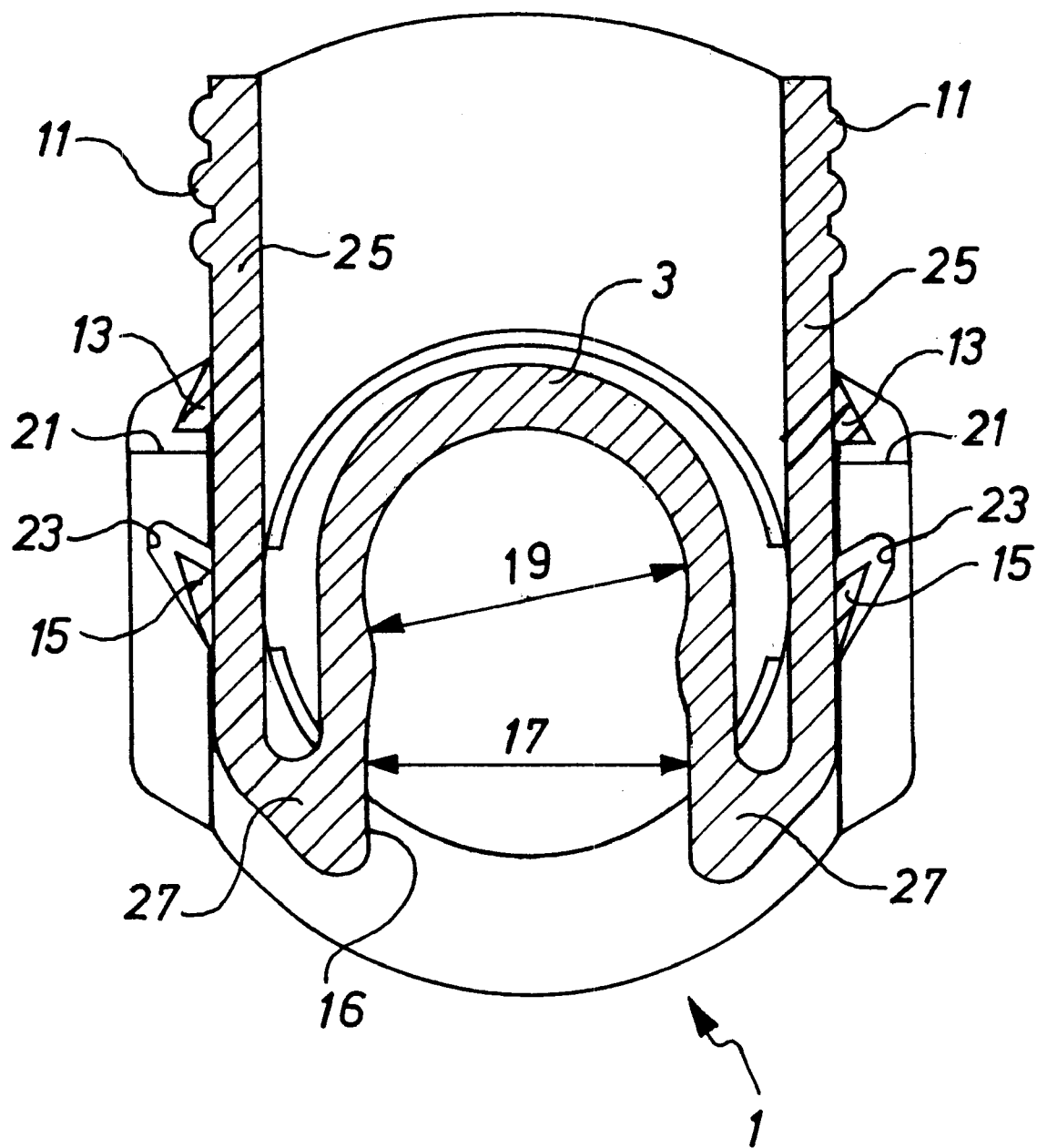
FIG. 3 shows a cross section view through a coupling housing with locking element in accordance with FIG. 1.

In FIG. 3, the interaction of the locking element 3 and the coupling housing 1 is shown in cross section. In this representation, it can be seen that the end stops 13, in cooperation with stop surfaces 21 of the coupling housing 1, limit the path of the locking element 3 in the downward direction. In this example, the coupling housing 1 is open in the downward direction. Furthermore, it can be seen that when the gripping surfaces 11 are moved toward each other, the projections 15 also move toward each other and thus emerge from the depressions 23 of the coupling housing 1. Once the projections 15 have left the depressions 23, the locking element 3 can be moved upwardly and out of the coupling housing 1. The gripping surfaces 11 are in functional connection with the projections 15 via one one-armed lever 25 each. Roughly, the fulcrum of the one-armed levers 25 is located in the area of the connection 27 between the one-armed lever 25 and the locking element 3.

In FIGS. 4a and 4b, the interaction of the coupling housing 1 and a plug-nipple 31 is shown. The plug-in nipple 31 has a flange 33. In FIG. 4a, the plug-in nipple 31 has not yet been completely introduced into the recess 7 of the coupling housing 1. The recess 7 has in its initial area a diameter that is somewhat greater than the diameter of the flange 33, so that the plug-in nipple 31 can be introduced into the recess 7 until the flange 33 indirectly rests against a stop surface 35. In this way, the axial position of the plug-in nipple 31 with respect to the coupling housing 1 is fixed. In its front area, the plug-in nipple 31 has an incline 37 that makes it possible for the plug-in nipple 31 to slide through O-rings 39 present in the recess 7 and a support ring 41. In this way, sealing of the through bore 43 of the coupling housing 1 and of the through bore 45 of the plug-in nipple with respect to the outside is achieved.

In order to prevent the O-rings 39 from sliding and to protect the O-rings 39 against damage, a casing 46 is provided which has a flange that is arranged between the flange 33 of the plug-in nipple 1 and the end stop 35 of the coupling housing 1.

In FIG. 4b, the plug-in nipple 31 has assumed a position relative to the coupling housing 1 which makes it possible to introduce the locking element 3, not shown, into the opening 9. When the locking element 3 is engaged in the coupling housing 1 see FIG. 1, the plug-in nipple 31 can no longer be guided out of the recess 7. This locking is achieved in that the diameter 19 of the arc of the cut-out 16 of the locking element 3 corresponds to the outer diameter 31 and in that the flange 33 has a greater diameter. For this reason, the flange 33 cannot be moved through the cut-out 16 of the locking element 3. Only after the locking element 3 has been removed from the opening 9, can the plug-in nipple 31 be guided out of the position shown in FIG. 4b. In the FIGS. 4a and 4b, the crosspieces 10 can also be seen.

Figure 5:
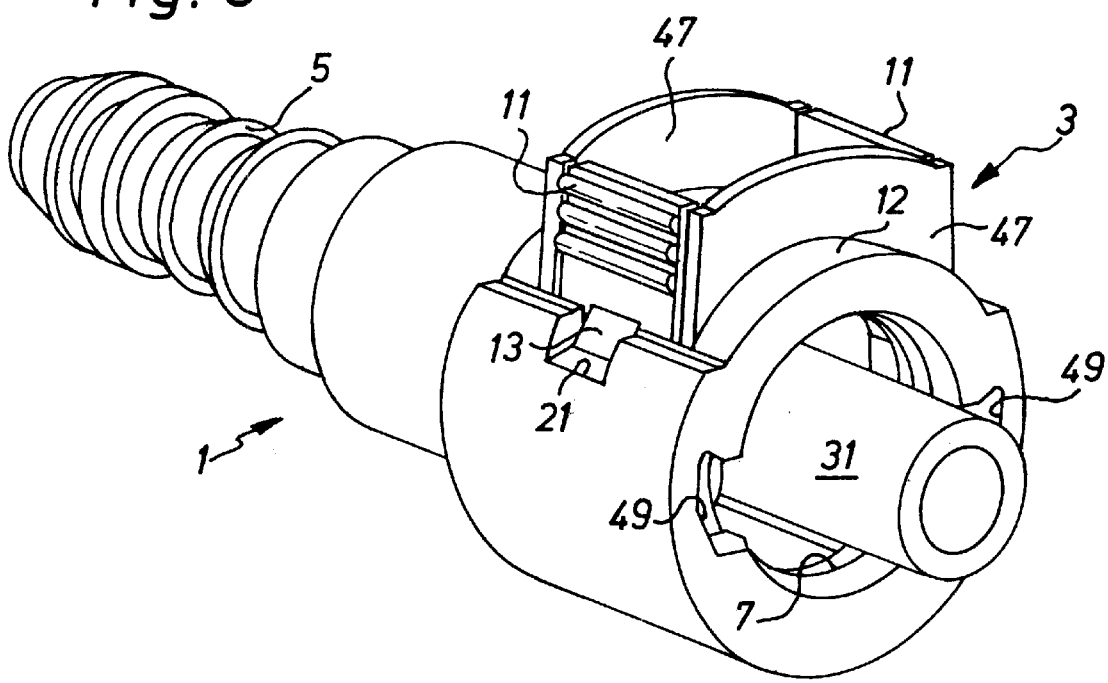
FIG. 5 shows a second embodiment of a coupling housing of the invention with engaged locking element.

FIG. 5 shows a second example of a rapid-action coupling of the invention. The locking of the plug-in nipple 31 in the coupling housing 1 takes place essentially in the same way as in the example according to the FIGS. 1 to 4. A difference lies in that the locking element 3 has walls 47 on the sides of the gripping surfaces 11 that protect the gripping surfaces 11 against the influence of excessive force. Thus, the walls 47 assume the same function as the crosspieces 10 in accordance with the example according to the FIGS. 1 to 4.

Common to both examples described thus far is the fact that the recess 7, at least in its initial area, is not rotationally symmetrical, but rather, has two depressions 49. These depressions ensure, for example, the removeability of the mold of the upper die of the injection-molding die with which the depressions 23 are formed.

Moreover, the depressions, 49, not shown in FIG. 5, in connection with correspondingly formed projections of the plug-in nipple 31, can make possible a torsion-resistant connection of the coupling housing 1 and the plug-in nipple 31. This is possible in the same way in the subsequently described embodiment according to FIG. 7.

Figure 6:
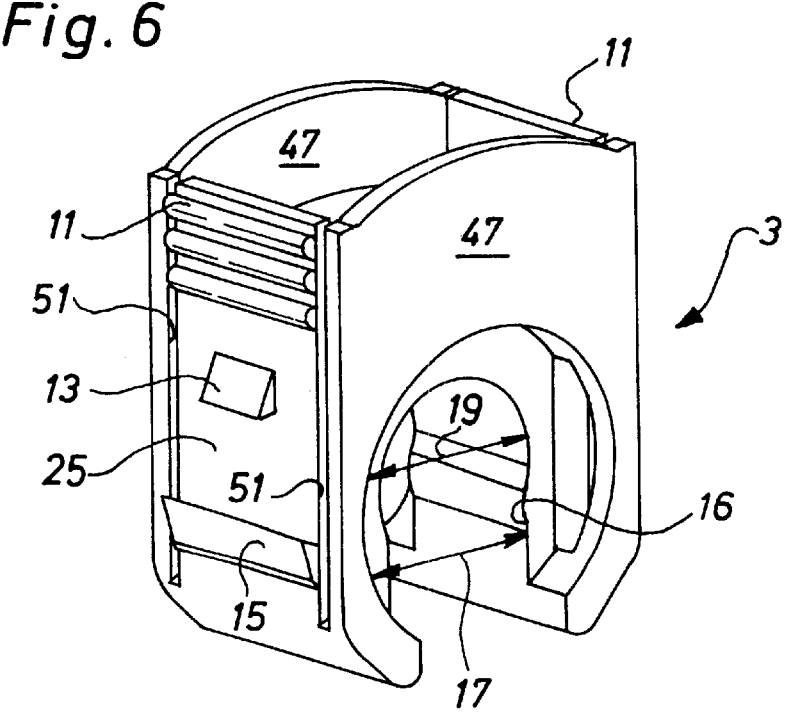
FIG. 6 shows a view of the accompaning locking element.

FIG. 6 shows the locking element 3 which is part of the embodiment example according to FIG. 5. The fulcrum of the one-armed lever 25 is approximately where the slits 51 end between the one-armed lever 25 and the walls 47.

FIG. 7 shows another embodiment of a rapid-action coupling in accordance with the invention. In contrast to the two previously described embodiments, the locking element 3 cannot be removed from the coupling housing 1. This is ensured by the end stop 13 interacting with the stop surface 21.

The locking element 3 can be moved back and forth between the position shown in FIG. 7 and position in which the end stop 13 rests on the stop surface 21.

In the position shown, the flange 33 of the plug-in nipple 31 is locked by the cut-out 16 of the locking element 3, i.e. the plug-in nipple 31 cannot be pulled out of the coupling housing 1. When the locking element 3 assumes its upper position, it releases the flange 33 of the plug-in nipple 31 so that the latter can be guided out of the coupling housing 1. In order to ensure that the locking element 3 in the locked state does not inadvertently move into its upper position, a projection 15 is provided on the one-armed lever 25 that interacts with the stop surface 21 of the coupling housing 1.

When the position of the locking element 3 is to be changed, the one-armed lever 25, in the area of the gripping surface 11, is pressed inward in the direction of the arrow 55. Thereby, the projection 15 is also made to move in the direction of the arrow 55 and it emerges from the recess 23 and the locking element 3 can be moved into its upper position.

In the example shown in FIG. 7, the coupling housing 1 is closed below, so that the path of the locking element 3 is limited in this direction.

All the characteristics indicated in the description, the subsequent claims and the drawing can be essential to the invention, individually as well as in any desired relation with respect to each other.

What is claimed is:

1. A rapid-action coupling for hoses and rigid lines with a coupling housing, a plug-in nipple and a locking element, when the coupling housing has a recess and an opening that extends essentially vertically with respect to the longitudinal axis of the recess, with a first end and a second end, wherein the plug-in nipple and the coupling housing can be connected by introducing the plug-in nipple into the recess, and this connection can be locked by introducing the locking element into the first end of the opening and engaging it, and wherein the locking element has means for releasing an engagement, characterized in that the means for releasing the engagement in the engaged state of the locking element is arranged in the locking element having an insertion end insertable into the opening, the releasing means operable from an end of the locking element opposite from the insertion end, the releasing means including a one-arm lever connected to a fulcrum located proximate the insertion end of the locking element, the locking element including a projection in functional connection with the releasing means for locking the locking element to the coupling housing, the projection positioned between the fulcrum and the releasing means on the locking element.

2. The rapid-action coupling, in accordance with claim 1, characterized in that the opening has at least one recess and that a projection of the locking element can engage the recess.

3. The rapid-action coupling, in accordance with claim 1, characterized in that the lever is spring-loaded.

4. The rapid-action coupling, in accordance with claim 1, characterized in that the plug-in nipple has a flange, in that the locking element has at least one cut-out which, in the engaged state of the locking element, grips around the plug-in nipple in the area between the flange and of the recess that is opposite the base of the recess and whose width is at least in part smaller than diameter of the flange.

5. A rapid-action coupling for hoses and rigid lines with a coupling housing, a plug-in nipple and a locking element, when the coupling housing has a recess and an opening that extends essentially vertically with respect to the longitudinal axis of the recess, with a first end and a second end, wherein the plug-in nipple and the coupling housing can be connected by introducing the plug-in nipple into the recess, and this connection can be locked by introducing the locking element into the first end of the opening and engaging it, and wherein the locking element has means for releasing an engagement, characterized in that the means for releasing the engagement in the engaged state of the locking element is arranged in the locking element having an insertion end insertable into the opening, the releasing means operable from an end of the locking element opposite from the insertion end, the second end of the opening in the coupling housing being closed.

6. The rapid-action coupling, in accordance with claim 1, characterized in that the coupling housing and the plug-in nipple can be connected with each other in a torsion-resistant manner.

7. The rapid-action coupling, in accordance with claim 1, characterized in that the locking element has an end stop interacting with the coupling housing.

8. The rapid-action coupling, in accordance with claim 1, characterized in that at least one of the coupling housing, the plug-in nipple and the locking element are made of a synthetic material.

9. The rapid-action coupling, in accordance with claim 1 wherein:

the insertion end is formed on each of two sides of the locking element, each side forming the one-armed lever.

10. The rapid-action coupling, in accordance with claim 1 wherein:

the locking element includes two sides, each side carrying the one-armed lever.

* * * * *